US006880860B2

(12) United States Patent
Gonzales et al.

(10) Patent No.: US 6,880,860 B2
(45) Date of Patent: Apr. 19, 2005

(54) FLUID CONDUCTING ELBOW

(76) Inventors: James A. Gonzales, 14208 Sarasota, Redford, MI (US) 48230; Gladwyn W. Cummins, 12370 Risman Dr., Apt. 201, Plymouth, MI (US) 48170; Robert K. Atwood, deceased, late of Rochester, MI (US); by Maria D. Atwood, legal representative, 3450 John R. Rd., Rochester, MI (US) 48307

( * ) Notice: Subject to any disclaimer, the term of this patent is extended or adjusted under 35 U.S.C. 154(b) by 68 days.

(21) Appl. No.: 10/285,272

(22) Filed: Oct. 31, 2002

(65) Prior Publication Data

US 2004/0084899 A1 May 6, 2004

(Under 37 CFR 1.47)

(51) Int. Cl.[7] ............................................... F16L 43/00
(52) U.S. Cl. ..................................................... 285/179
(58) Field of Search ................................. 285/179, 183, 285/179.2, 179.1

(56) References Cited

U.S. PATENT DOCUMENTS

| | | | | |
|---|---|---|---|---|
| 2,011,721 A | * | 8/1935 | Luff | 285/179 |
| 3,844,586 A | * | 10/1974 | Olen | 285/179 |
| 4,387,914 A | * | 6/1983 | Paulson et al. | 285/179.1 |
| 4,995,645 A | * | 2/1991 | Pausch | 285/179.1 |
| 5,039,135 A | * | 8/1991 | Palmer | 285/179 |
| 5,060,984 A | * | 10/1991 | Hess | 285/179.1 |
| 5,197,509 A | | 3/1993 | Cheng | |
| 5,288,111 A | * | 2/1994 | Storf et al. | 285/179 |
| 5,323,661 A | | 6/1994 | Cheng | |
| 5,529,084 A | | 6/1996 | Mutsakis et al. | |
| 5,992,465 A | | 11/1999 | Jansen | |
| 6,289,934 B1 | | 9/2001 | Welker | |
| 6,431,611 B1 | * | 8/2002 | Andersen | 285/183 |
| 6,439,267 B1 | | 8/2002 | Welker | |

* cited by examiner

*Primary Examiner*—David Bochna
(74) *Attorney, Agent, or Firm*—Brooks Kushman P.C.

(57) ABSTRACT

An elbow comprising a body including an inlet having a inlet cross-sectional area is disclosed. The elbow includes a first section having a first end in communication with the inlet and a second end. The second end has a first cross-sectional area larger than the inlet cross-sectional area. A second section having first end and a second end is also included. The first end is in communication with the second end of the first section. The second end has a second cross-sectional area. The elbow includes a transitional section having a first end being in communication with the second end of the second section. The transitional section has an exit surface. An outlet is provided having a first end in communication with the exit surface and an second end through which the fluid exits.

21 Claims, 2 Drawing Sheets

FLUID CONDUCTING ELBOW

BACKGROUND OF THE INVENTION

1. Field of the Invention

The present invention relates to an elbow for fluid flow, and in particular, a fluid conducting elbow for an automotive engine.

2. Background Art

When fluid passes through a conventional fluid conducting elbow, the fluid flow becomes turbulent. The turbulence can be caused by a number of factors such as boundary layer separation, vortices, pressure waves, and cavitation. The turbulence also causes a drop in the fluid pressure through the elbow. In most circumstances, the turbulence and pressure drop are sought to be minimized so that the fluid flows smoother and with less resistance.

Various solutions to these problems are shown in the prior art. For example, U.S. Pat. No. 5,992,465 issued to Jansen discloses an insert for placement within a conduit. The insert function to provide a quasi-laminar flow through the conduit. U.S. Pat. No. 6,289,934 issued to Welker discloses a conventional elbow having a plurality of vanes therein to guide the fluid and reduce turbulence. U.S. Pat. No. 5,323,661 issued to Cheng discloses a pre-rotator head ahead of the elbow to reduce turbulence in the pipe flow.

While these solutions may provide reduced turbulence and minimal back pressure, these solutions add costs and complicate the manufacture and assembly of the elbow.

Accordingly, a need exists for an elbow for fluid flow that has a minimal pressure drop that is simple and inexpensive to manufacture and can readily replace existing elbows.

SUMMARY OF THE INVENTION

Accordingly, this invention discloses a fluid flow elbow that has a minimal pressure drop that is simple and inexpensive to manufacture and readily replaces existing elbows.

In a preferred embodiment, the invention discloses a hollow fluid conducting elbow including an inlet having a inlet cross-sectional area. The elbow also includes a first section having a first end being in communication with the inlet and a second end. The second end has a first cross-sectional area wherein the first cross-sectional area is larger than the inlet cross-sectional area to retard the rate of flow of the fluid. A second section having first end and a second end is also included. The first end of the second section is in communication with the second end of the first section. The second cross-sectional area has a different shape than the first cross-sectional area to change the direction of the flow of the fluid. The elbow further includes a transitional section having a first end being in communication with the second end of the second section. The transitional section has an exit surface. An outlet is provided having a first end in communication with the exit surface and an second end through which the fluid exits from the elbow. The second end has an outlet cross-sectional area smaller than the exit surface.

In another preferred embodiment, the elbow includes a hollow body having an inlet having an inlet cross-sectional area. A first section is included having a first cross-sectional area that is larger than the inlet cross-sectional area. The invention also includes a second section having a first end and a second end and having a length wherein the shape of the second section changes along the length of the section. The elbow further includes an outlet section having a section in communication with the second section and an exit surface having an aperture wherein the aperture is smaller than the exist surface.

In yet another preferred embodiment of the invention, the elbow includes a hollow body having an inlet with an inlet cross-sectional area. A transitional round to quadrilateral segment is included wherein the transitional round to quadrilateral segment has a round to quadrilateral cross-section area larger than the inlet cross-sectional area. The quadrilateral segment has an aspect ratio that changes along the length of the segment The elbow further includes a modified cylindrically shaped end segment having an open side in communication with the quadrilateral segment and an exit surface having an aperture therethrough with an aperture cross-sectional area. An outlet extends from the exit surface. The outlet has an outlet cross-sectional area smaller then aperture cross-sectional area.

The above objects and other objects, features, and advantages of the present invention are more readily understood from a review of the attached drawings and the accompanying specification and claims.

DETAILED DESCRIPTION OF THE PREFERRED EMBODIMENT(S)

Figure 1:
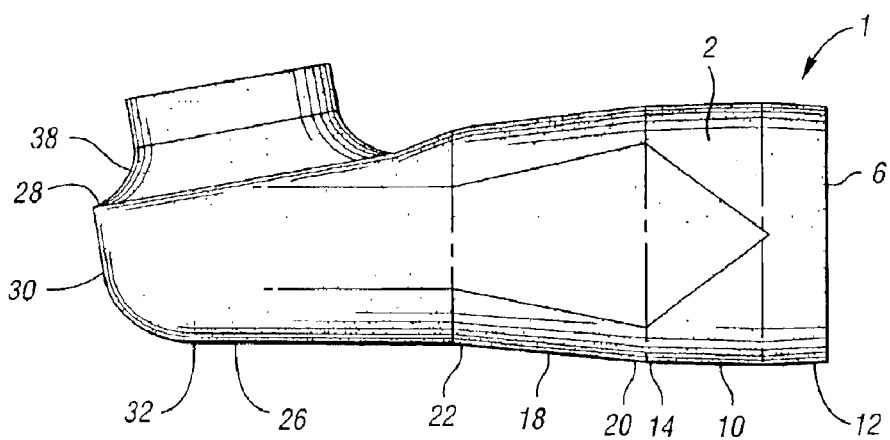
FIG. 1 is a side view of the elbow of the present invention.
Figure 2:
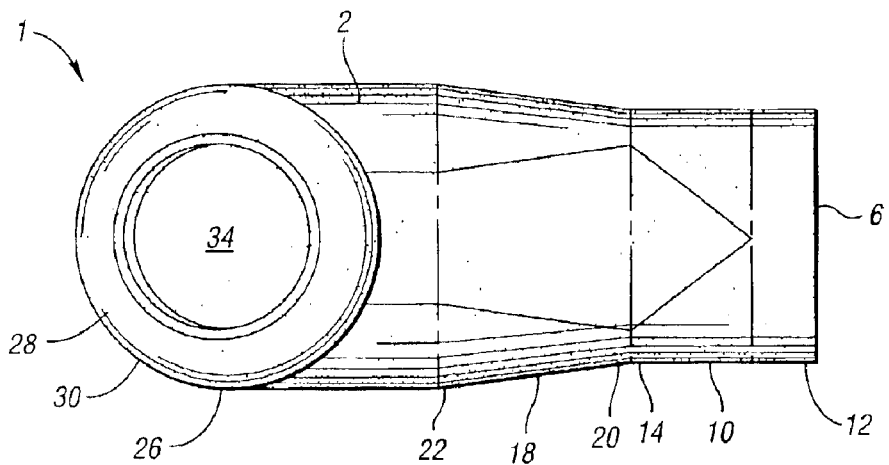
FIG. 2 is a plan view of the elbow of the present invention.
Figure 3:
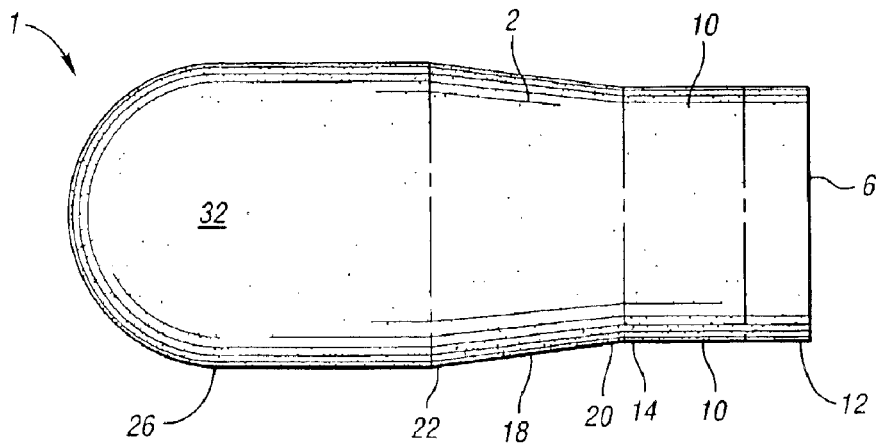
FIG. 3 is a bottom view of the of the elbow of the present invention.
Figure 4:
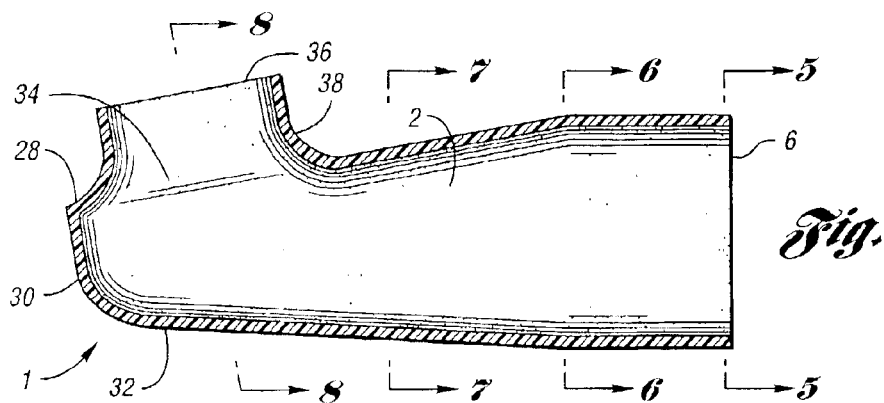
FIG. 4 is a cross-sectional view of the elbow of the present invention.
Figure 5:
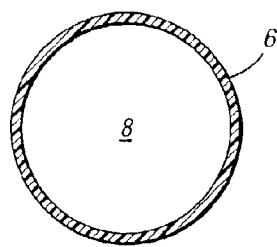
FIG. 5 is a cross-sectional view of the elbow of the present invention of FIG. 4 along lines 5—5.

Referring now to FIGS. 1–8, a fluid conducting elbow 1 is illustrated. Preferably, the fluid conducting elbow is manufactured out of a plastic material such as rubber, fiberglass, ABS, polycarbonate, polyethylene, nylon, or a composite or blend using one of the identified polymers such as a glass filled nylon. The elbow may be manufactured using, for example, a molding process such as injection molding, rotational molding, or blow molding or other processes. The elbow could also be manufactured out of other materials, such as metals, using other processes, such as, but not limited to casting, forming, or powder metal processes.

In a rotational molding operation, two mold halves are provided having cavities defining the shape of the finished part. Pre-measured plastic resin is loaded into the mold, and then the mold halves are heated by, for example, moving the molds into an oven where they are slowly rotated on both the vertical and horizontal axis. The melting resin sticks to the hot mold halves and coats every interior surface evenly. The mold continues to rotate during the cooling cycle so the parts retain an even wall thickness. Once the parts are cooled, they are released from the mold and trimmed to final shape.

In a blow molding operation, two mold haves are provided having cavities defining the shape of the finished part. A parison of heated plastic is dropped between the mold halves. The mold halves close about the parison and air is blown into the parison forcing the molten plastic to take the shape of the cavities. When the plastic solidifies, the mold halves are separated and the molded part is removed and trimmed to finish.

The elbow 1 may be used to conduct the flow of any fluid such as, but not limited to, air, water, and fuel. In particular, this elbow 1 is used to direct air to a carburetor or a throttle body for a fuel injected automotive engine (not shown). The elbow could also be used to conduct fluid through a pipeline or air through HVAC ducts.

The preferred embodiment discussed below is for directing air into a throttle body for various automotive engines. The elbow of the present invention could easily be modified to accommodate other sized engines from different engine manufacturers without departing from the scope of this invention. Further, the size and shape of the elbow can be modified and still satisfactorily function for the same engine without departing from the scope of the invention.

The elbow 1 comprises a hollow body 2 including an inlet 6 which has an inlet cross-sectional area 8 (shown in FIG. 5) to communicate the elbow with a source of fluid such as a conduit or conduits (not shown). Although the inlet 6 and inlet cross-sectional area 8 are shown round in these drawings, they could be shaped otherwise for different circumstances or applications such as connecting to square conduits.

The elbow 1 also includes a first section 10 having a first end 12 in communication with the inlet 6 and a second end 14. The second end 14 has a first cross-sectional area 16 (shown in FIG. 6) which is larger than the inlet cross-sectional area 8. The increased cross-sectional area lowers the restriction of flow through the elbow.

Figure 6:
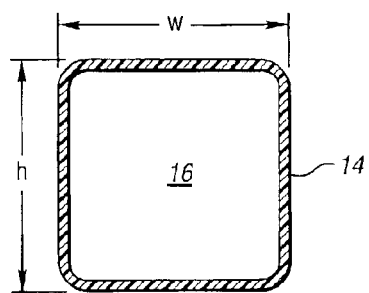
FIG. 6 is a cross-sectional view of the elbow of the present invention of FIG. 4 along lines 6—6.
Figure 7:
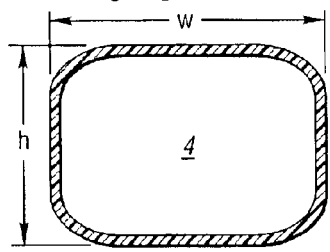
FIG. 7 is a cross-sectional view of the elbow of the present invention of FIG. 4 along lines 7—7.
Figure 8:
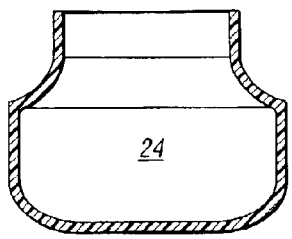
FIG. 8 is a cross-sectional view of the elbow of the present invention of FIG. 4 along lines 8—8.

A second section 18 has a first end 20 which is in communication with the second end 14 of the first section 10. The second section 18 has a second end 22 which has a second cross-sectional area shown in FIG. 7. The shape of the cross sectional area has changed such that its width w is greater than its height h as shown in FIGS. 6 and 7. The cross-sectional area through the second section may remain substantially constant or it may change. The change in shape of the fluid flow prepares the fluid to exit from the elbow with a smaller pressure drop.

A transitional section 26 communicates with the second section 18. In the preferred embodiment, the transitional section 26 is a modified cylindrically shaped section comprising a half cylinder with tangential extensions and defining an opening for communication with the second section 18. The opening is essentially the second cross-sectional area 24. The modified cylindrically shaped transitional section 26 has a top or exit surface 28, a side surface 30, a bottom surface 32, and an opening which communicates with the second section. However, the transitional section 26 may also be shaped otherwise such as a cylinder or rectangle depending on the particular requirements for the elbow 1. The top or exit surface 28 may be angled (as shown) or straight relative to the body to provide the necessary fluid flow to the next component.

The top or exit surface 28 comprises an aperture 34 through which the fluid exits. An outlet 36 extends from the top or exit surface 28. Preferably, the outlet 36 has a cross-sectional area smaller than the aperture 34. The outlet may have radii 38 to improve the flow of fluid exiting the elbow 1.

Alternatively, the aperture 34 may also extend from a portion of the second portion depending on the particular design of the elbow 1.

Figure 9:
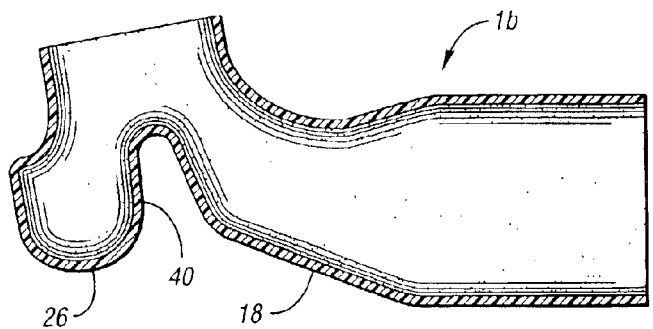
FIG. 9 is a cross-sectional view of a second embodiment of the elbow according to the present invention.

Referring now to FIG. 9, another embodiment of the elbow 1 is shown in cross-sectional view. In this embodiment, a protrusion 40 extends from the bottom surface 32 of the transitional section 26 to further direct the flow of fluid through the elbow. The protrusion 40 causes the fluid to circulate around the aperture 34 for smoother fluid flow through the outlet.

In a preferred embodiment for a 77 mm throttle body, the elbow 1 of the first embodiment showed a considerable decrease in the pressure drop in inches of water compared to a conventional elbow as illustrated in the chart below.

| | kg/hr | | | | | | | | | |
|---|---|---|---|---|---|---|---|---|---|---|
| | 0 | 17 | 30 | 100 | 300 | 500 | 850 | 1050 | 1150 | 1300 |
| embodiment 1 | 0 | .01 | .02 | .09 | .57 | 1.42 | 3.67 | 5.44 | 6.48 | 7.88 |
| conventional elbow | 0 | .02 | .02 | 0.22 | 1.66 | 4.67 | 12.82 | 18.32 | 21.45 | 23.56 |

For example, at 1300 kg/hr, the pressure drop for the first embodiment of the present invention was 33% of the pressure drop of the conventional elbow.

The data provided above are for one particular application and can be modified for other application. Further, the dimensions may be modified for the same application and still function satisfactorily.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hollow fluid conducting elbow comprising:
   an inlet having a inlet cross-sectional area, the inlet for receiving fluid flow;
   a first section having a first end and a second end, the first end being in communication with the inlet, the second end having a first cross-sectional area larger than the inlet cross-sectional area to retard the rate of flow of the fluid;
   a second section having a first end and a second end, the first end of the second section being in communication with the second end of the first section, the second end of the second section having a second cross-sectional area, the second cross-sectional area having a different shape than the first cross-sectional area to change the direction of the flow of the fluid;
   a transitional section having a first end in communication with the second end of the second section, the transitional section having an exit surface, the exit surface including an aperture disposed therethrough; and
   an outlet having a first end and a second end through which the fluid exits from the elbow, the first end being in communication with at least a portion of the exit surface, the second end having an outlet cross-sectional area smaller than the exit surface aperture.

2. The elbow of claim 1 wherein the transitional section is semi-cylindrically shaped having a top surface, a side surface, and a bottom surface, wherein the fluid flow enters through a side surface and exists through the top surface.

3. The elbow of claim 1 further comprising a radius at an intersection of the outlet and the exit surface.

4. The elbow of claim 1 wherein the transitional section further includes a projection extending from a bottom surface into the elbow.

5. The elbow of claim 1 wherein the first end of the first section has a round cross-sectional area and the second end of the first section has a quadrilateral-shaped cross-sectional area.

6. The elbow of claim 1 wherein the first end of the first section is generally round and the second end of the first section is generally square.

7. The elbow of claim 6 wherein the first end of the second section is generally square and the second end of the second section is generally rectangular.

8. The elbow of claim 7 wherein the transitional section is cylindrically shaped having a top end, a bottom end, and a side end wherein the second section communicates with the transitional section through a side end.

9. The elbow of claim 8 further comprising a projection extending from a bottom surface end of the transitional section into the elbow.

10. The elbow of claim 1 wherein the elbow is made by rotationally molding plastic.

11. The elbow of claim 1 wherein the elbow is injection molded.

12. The elbow of claim 1 wherein the elbow is blow molded.

13. The elbow of claim 1 wherein the elbow is manufactured out of plastic.

14. The elbow of claim 1 wherein the elbow is manufactured out of metal.

15. A fluid conducting elbow comprising:
   a hollow body having an inlet having an inlet cross-sectional area;
   a first transitional section having a first end and a second end, the second end having a first cross-sectional area that is larger than the inlet cross-sectional area;
   a second section having a first end and a second end and having a length, wherein the shape of the second section changes along the length of the section; and
   an outlet section having an initial section in communication with the second section and an exit surface having an aperture, the outlet section including an outlet having a cross-sectional area smaller than the exit surface aperture.

16. The elbow of claim 15 wherein the outlet section is a modified cylindrically shaped section having a top surface, a lower surface and a side surface, wherein the second section communicates with the outlet section through the side surface and the exit surface is the top surface.

17. The elbow of claim 16 further comprising a projection extending into the elbow from the bottom surface.

18. A fluid conducting elbow comprising: a hollow body having an inlet with an inlet cross-sectional area;
   a transitional round to quadrilateral segment having a round to quadrilateral cross-sectional area larger than the inlet cross-sectional area;
   a quadrilateral segment having a length and an aspect ratio that changes along the length of the segment;
   a modified cylindrically shaped end segment having an open side in communication with the quadrilateral segment and an exit surface having an aperture therethrough with an aperture cross-sectional area; and
   an outlet extending from the exit surface, the outlet having an outlet cross-sectional area smaller than the aperture cross-sectional area.

19. The elbow of claim 18 wherein the modified cylindrically shaped end segment has a top surface and the elbow further comprises a projection extending into the elbow from the bottom surface.

20. The elbow of claim 18 wherein the elbow is manufactured of plastic.

21. A hollow fluid conducting elbow, comprising:
   an inlet having a inlet cross-sectional area, the inlet for receiving fluid flow;
   a first section having a first end and a second end, the first end being in communication with the inlet and having a generally round cross-sectional area, the second end having a first cross-sectional area generally quadrilaterally shaped and larger than the inlet cross-sectional area to retard the rate of flow of the fluid;
   a second section having a first end and a second end, the first end of the second section being in communication with the second end of the first section, the second end of the second section having a second cross-sectional area, the second cross-sectional area having a different shape than the first cross-sectional area to change the direction of the flow of the fluid;
   a transitional section having a first end in communication with the second end of the second section, the transitional section having an exit surface; and
   an outlet having a first end and a second end through which the fluid exits from the elbow, the first end being in communication with at least a portion of the exit surface, the second end having an outlet cross-sectional area smaller than the exit surface.

* * * * *